(12) United States Patent
Cheng

(10) Patent No.: US 7,004,547 B1
(45) Date of Patent: Feb. 28, 2006

(54) SAFETY BELT POSITIONING DEVICE

(76) Inventor: Sheng-Hsiung Cheng, P.O. Box No. 6-57, Junghe, Taipei 235 (TW)

( * ) Notice: Subject to any disclaimer, the term of this patent is extended or adjusted under 35 U.S.C. 154(b) by 0 days.

(21) Appl. No.: 10/928,097

(22) Filed: Aug. 30, 2004

(51) Int. Cl.
  *B60R 22/30* (2006.01)
  *A44B 11/12* (2006.01)
(52) U.S. Cl. ............................. 297/483; 24/170; 24/191
(58) Field of Classification Search ............... 297/482, 297/483; 24/170, 191; 280/808
  See application file for complete search history.

(56) References Cited

U.S. PATENT DOCUMENTS

| | | | | |
|---|---|---|---|---|
| 718,710 | A | * | 1/1903 | Houghton ..................... 24/166 |
| 3,171,184 | A | * | 3/1965 | Posse .......................... 606/120 |
| 3,252,193 | A | * | 5/1966 | Matthews et al. ............. 24/170 |
| 4,387,489 | A | * | 6/1983 | Dudek .......................... 24/133 |
| 4,893,835 | A | * | 1/1990 | Linden ......................... 280/808 |
| 5,350,196 | A | * | 9/1994 | Atkins ......................... 280/808 |
| 5,653,003 | A | * | 8/1997 | Freeman ...................... 24/543 |
| 5,791,688 | A | * | 8/1998 | Koledin ....................... 280/808 |
| 2003/0140461 | A1 | * | 7/2003 | Wilcock ....................... 24/191 |

FOREIGN PATENT DOCUMENTS

GB            1598398       *  9/1981

* cited by examiner

*Primary Examiner*—Peter M. Cuomo
*Assistant Examiner*—Joe Edell
(74) *Attorney, Agent, or Firm*—Troxell Law Office, PLLC

(57) ABSTRACT

A safety belt positioning device includes a top cover and a bottom cover pin jointed together, wherein a clasp is configured interior of a clasp-eye of the top cover, and the positioning device is fixedly secured directly on a location of the safety belt by means of the clasp, which not only effectuates easy installation, but also convenient adjustment thereof. The present invention is characterized in that the positioning device is moveably disposed on the safety belt, and upon using the safety belt, the clasp of the positioning device is utilized to fixedly secure length of the safety belt in accordance to physique of the passenger, thereby achieving objective of adjusting degree of tightness of the safety belt. Moreover, because of a tensile force of an interior spring, re-pullback on the safety belt will not occur, which thus provides even greater comfort to a passenger when seated.

3 Claims, 7 Drawing Sheets

SAFETY BELT POSITIONING DEVICE

BACKGROUND OF THE INVENTION (a) Field of the Invention

The present invention relates to a safety belt positioning device, and more particularly to a structure configured from pin jointing a top cover and a lower cover, wherein a clasp is configured to insert interior of a clasp-eye of the top cover, which thereby fixedly secures the positioning device at a position on a safety belt, and achieves objective of enabling adjusting degree of tightness of the safety belt therewith. The present invention not only effectuates easy installation, but also convenient adjustment thereof.

(b) Description of the Prior Art

Data collected in a Taiwan survey reveals that the casualty ratio for traffic accidents with regard to a driver and front seat passenger having "safety belt fastened" and "safety belt not fastened" is 1:7, which amply proves importance of fastening the safety belt. Hence, in recent years, the government has stipulated correlated statutory laws regarding necessary usage of the safety belt during a car journey, and a description regarding correct method of wearing the safety belt is relate d hereinafter. A majority of modern safety belts are automatic, however, attention must still be paid to the following points: (particularly for manually adjustable safety belts), a horizontal belt of the safety belt should transversely cross top of the thigh of a user rather than the abdomen, which thus immobilizes the hip of the user, thereupon, transversely cross a diagonal belt between the shoulder and the arm, whereupon the diagonal belt tightens across the chest and collarbone position of the user, and which thereby allows a belt clasp to hang down to a side of the body of the user. After ensuring the safety belt is not entangled with other articles or pressing down on anything, and, moreover, that the safety belt is not twisted, only then is the safety belt clasped together. If required, the safety belt can be further tightened as appropriate, however, overly tightening will result in an uncomfortable feeling for the user, and thus, a positioning device for adjusting length of the safety belt has appeared on the market.

Referring to FIGS. 1A and 1B, which show a conventional positioning device a structured to comprise a top cover a1 and a bottom cover a2, wherein a number of raised strips a11, a21 are configured on an inner surface of the top cover a1 and the bottom cover a2 respectively. Furthermore, edges of the top cover a1 and the bottom cover a2 are mutually connected by means of a connecting portion a3. A clasp a12 and a clasp-eye a22 are configured on other ends of the top cover a1 and the bottom cover a2 respectively. During usage, a safety belt b is first adjusted to a required length in accordance to physique of the passenger, thereafter, the top cover a1 and the bottom cover a2 are clasped together, whereupon the raised strips a11, a21 are utilized to fixedly clamp the positioning device a onto the safety belt b, and, because of a tensile force of an interior spring, re-pullback on the safety belt b is unlikely to occur, thus producing a moderate degree of tightness and enhancement in comfort. However, when an emergency happens, because the interior spring of the safety belt b generates an inwardly tensile force, which obstructs the positioning device a, thus the safety belt b is unable to automatically adjust in accordance with circumstances, and thereby results in an enormous reduction in protective functionality of the safety belt b.

Hence, in light of the aforementioned shortcomings, the inventor of the present invention specifically designed a positioning device that is both easy to install and convenient to adjust, moreover, in an emergency situation, because of a tension brace tensile force generated by the safety belt, a clasp of the positioning device, is able to automatically flip open, thereby avoiding reduction in the protective functionality of the safety belt.

SUMMARY OF THE INVENTION

In light of aforementioned shortcomings of a conventional configuration, the inventor of the present invention, having accumulated years of experience in related arts, attentively and circumspectively carried out extensive study and exploration to ultimately design a completely new safety belt positioning device.

A primary objective of the present invention is to provide a safety belt positioning device that effectuates easy installation and convenient adjustment of degree of tightness of a safety belt, moreover, actualizes avoiding reduction in safety functionality of the safety belt.

In order to achieve the aforementioned objective, the safety belt positioning device of the present invention is primarily structured to comprise a top cover and a bottom cover pin jointed together, wherein a clasp-eye and a spring aperture are defined at appropriate positions in the top cover. A clasp is configured interior of the clasp-eye, and a frontal end of the clasp is provided with a catch, and a rear end of the clasp is fixedly pin jointed within the clasp-eye, moreover, an underside of the clasp is provided with a rectangular raised strip and a spring anchor block. Two ends of a spring are configured atop the spring anchor block and within the spring aperture respectively. A portion of a top surface of the clasp is provided with a nonslip knobbly structure. Another end from a pin jointed end of the top cover is provided with a clasp switch and a catch. After the clasp has been pressed within the clasp-eye of the top cover, the catch of the clasp can clasp onto the clasp switch configured interior of the top cover. In addition, another end from a pin jointed end of the bottom cover is provided with a clasp portion that corresponds to the catch of the top cover. Interior of the bottom cover is provided with a rectangular groove and reinforcement ribs configured on two sides thereof, moreover, an outer surface of an exterior wall of the bottom cover is provided with a nonslip knobbly structure.

In accordance with the aforementioned configuration, when installing the present invention for usage thereof, the top and bottom cover of the positioning device directly clasp over the safety belt, thereby providing the positioning device with moveable flexibility, and which is considerably easy to install and convenient. Furthermore, after disposing the movable positioning device at an appropriate position on the safety belt, the clasp is inwardly press inserted into the top cover, thereby allowing the catch to clasp and fixedly secure onto the clasp switch of the top cover thereof, whereupon a rectangular raised strip configured interior of the clasp is utilized to firmly tighten the safety belt on reinforcement ribs configured in a groove interior of the bottom cover, and fixedly securing length of the safety belt thereat, thereby achieving objective of adjusting degree of tightness of the safety belt. In an emergency situation, the safety belt between a fixed end and a movable free end causes a tension brace tensile force to be generated, which actuates the clasp to automatically flip open by means of the tensile force, thereby allowing the safety belt to return to a free slideable state, thus avoiding reduction in protective functionality of the safety belt.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1A:
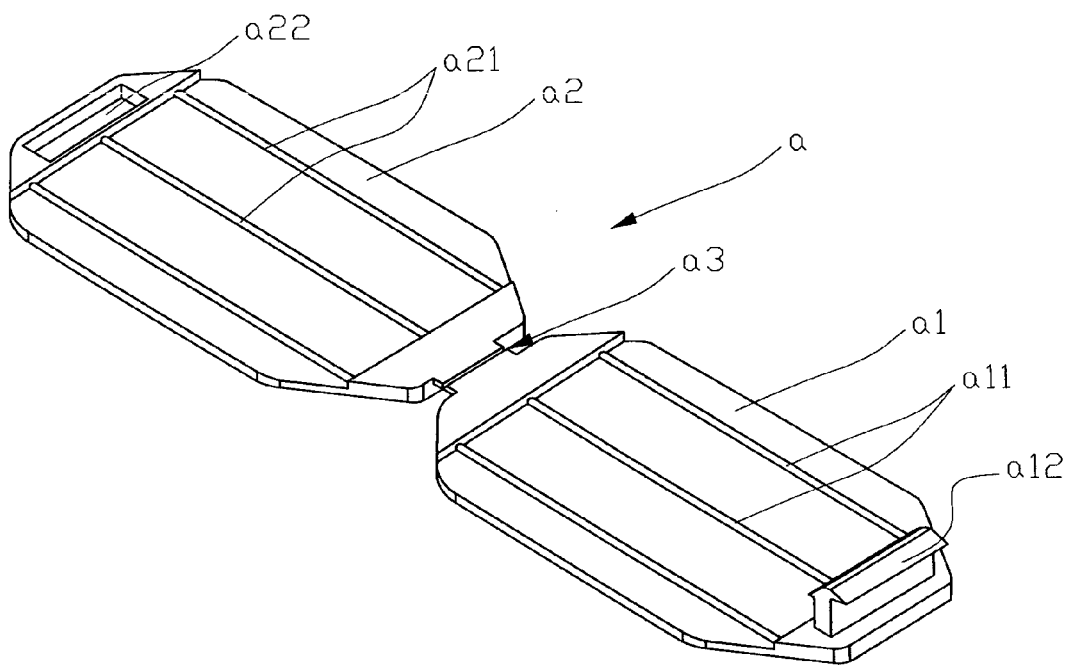
FIG. 1A shows a structural elevational view of a conventional safety belt positioning device.
Figure 1B:
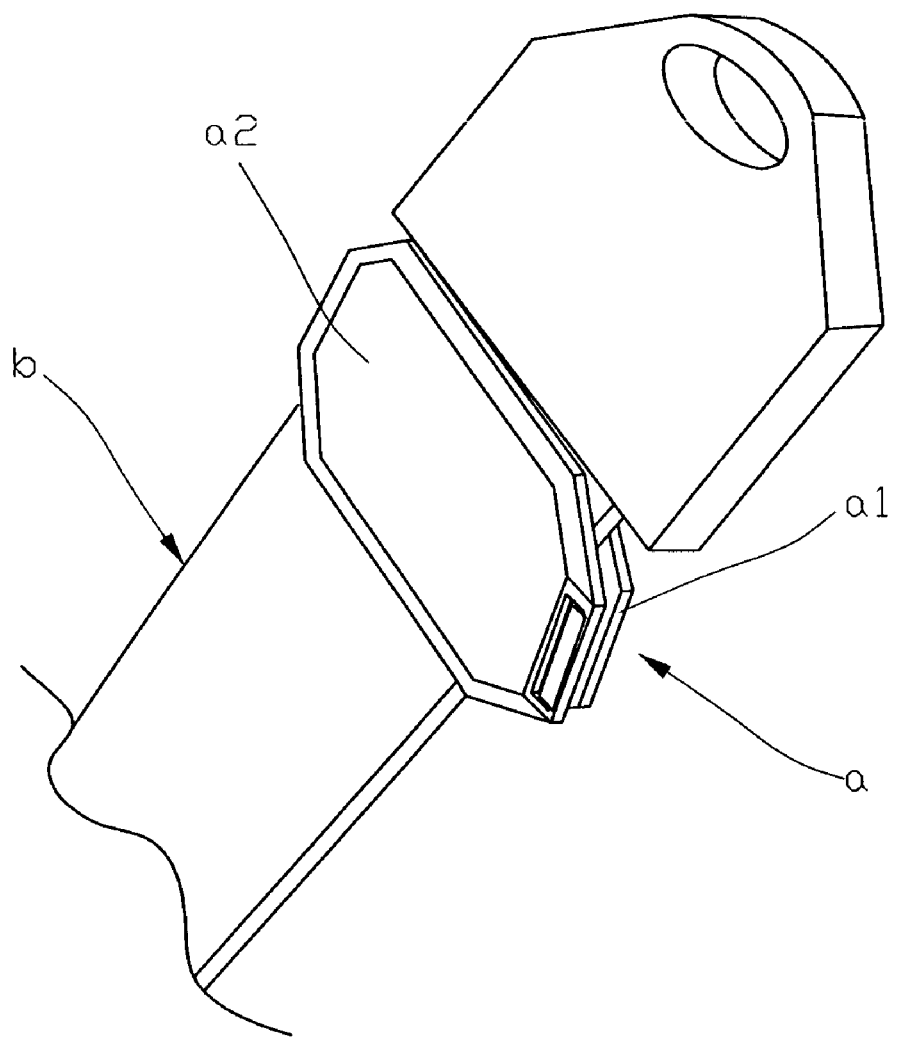
FIG. 1B shows a schematic view of the conventional safety belt positioning device in usage.
Figure 2:
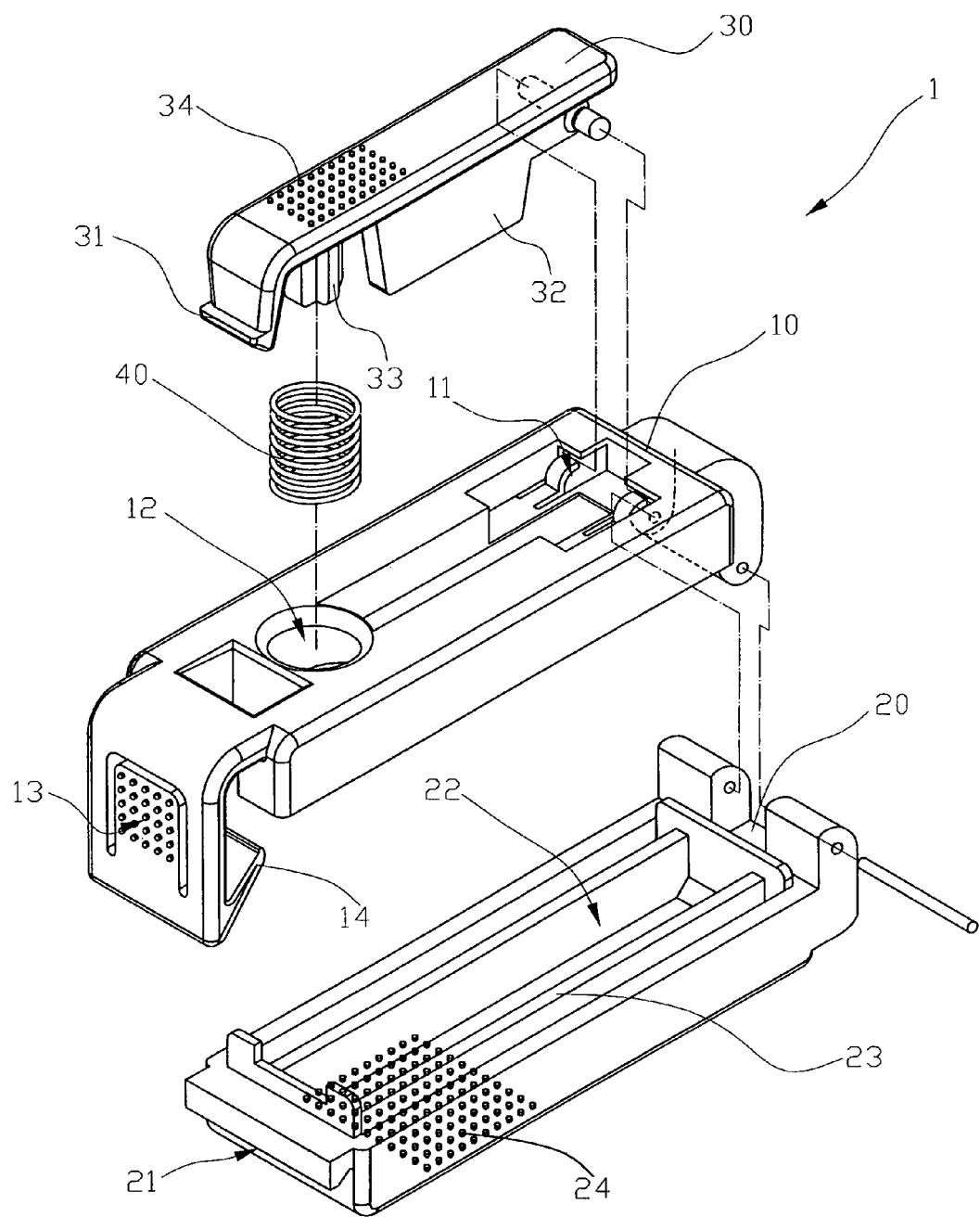
FIG. 2 shows an exploded elevational view according to the present invention.
Figure 3:
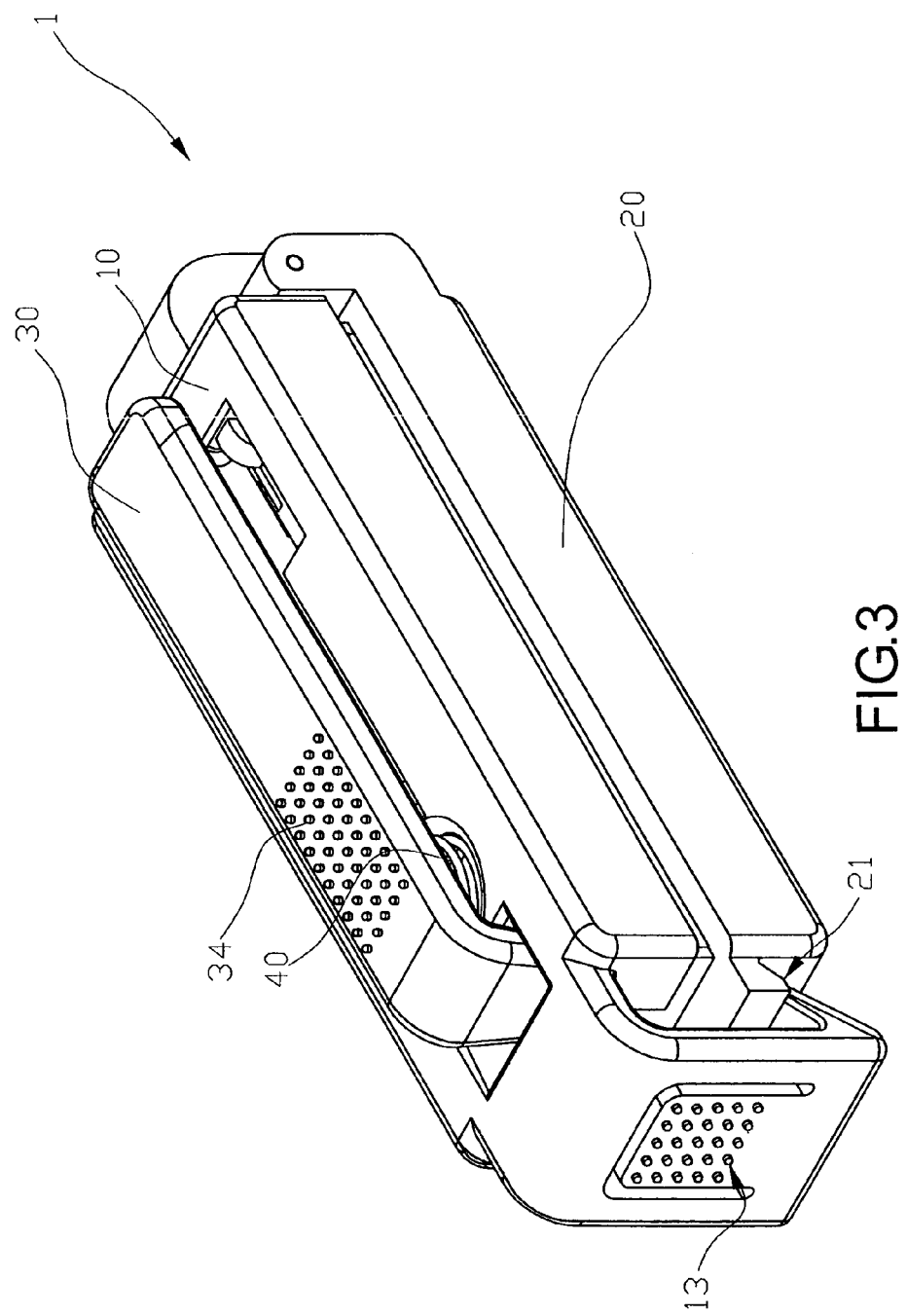
FIG. 3 shows a structural elevational view according to the present invention.

Referring to FIGS. 2 and 3, which show a safety belt positioning device of the present invention, wherein the positioning device 1 is structured to comprise pin jointing of a top cover 10 and a bottom cover 20, and wherein a clasp-eye 11 and a spring aperture 12 are defined at appropriate positions in the top cover 10. A clasp 30 is configured interior of the clasp-eye 11, and a frontal end of the clasp 30 is provided with a catch 31, and a rear end of the clasp 30 is fixedly pin jointed within the clasp-eye 11, moreover, an underside of the clasp 30 is provided with a rectangular raised strip 32 and a spring anchor block 33. Two ends of a spring 40 are configured atop the spring anchor block 33 and within the spring aperture 12 respectively. A portion of a top surface of the clasp 30 is provided with a nonslip knobbly structure 34. Another end from a pin jointed end of the top cover 10 is provided with a clasp switch 13 and a catch 14. After the clasp 30 has been press inserted within the clasp-eye 11 of the top cover 10, the catch 31 of the clasp 30 can clasp onto the clasp switch 13 configured interior of the top cover 10. In addition, another end from a pin jointed end of the bottom cover 20 is provided with a clasp portion 21 that corresponds to the catch 14 of the top cover 10. Interior of the bottom cover 20 is provided with a rectangular groove 22 and reinforcement ribs 23 configured on two sides thereof, moreover, an outer surface of an exterior wall 24 is provided with a nonslip, knobbly structure 24.

Figure 4:
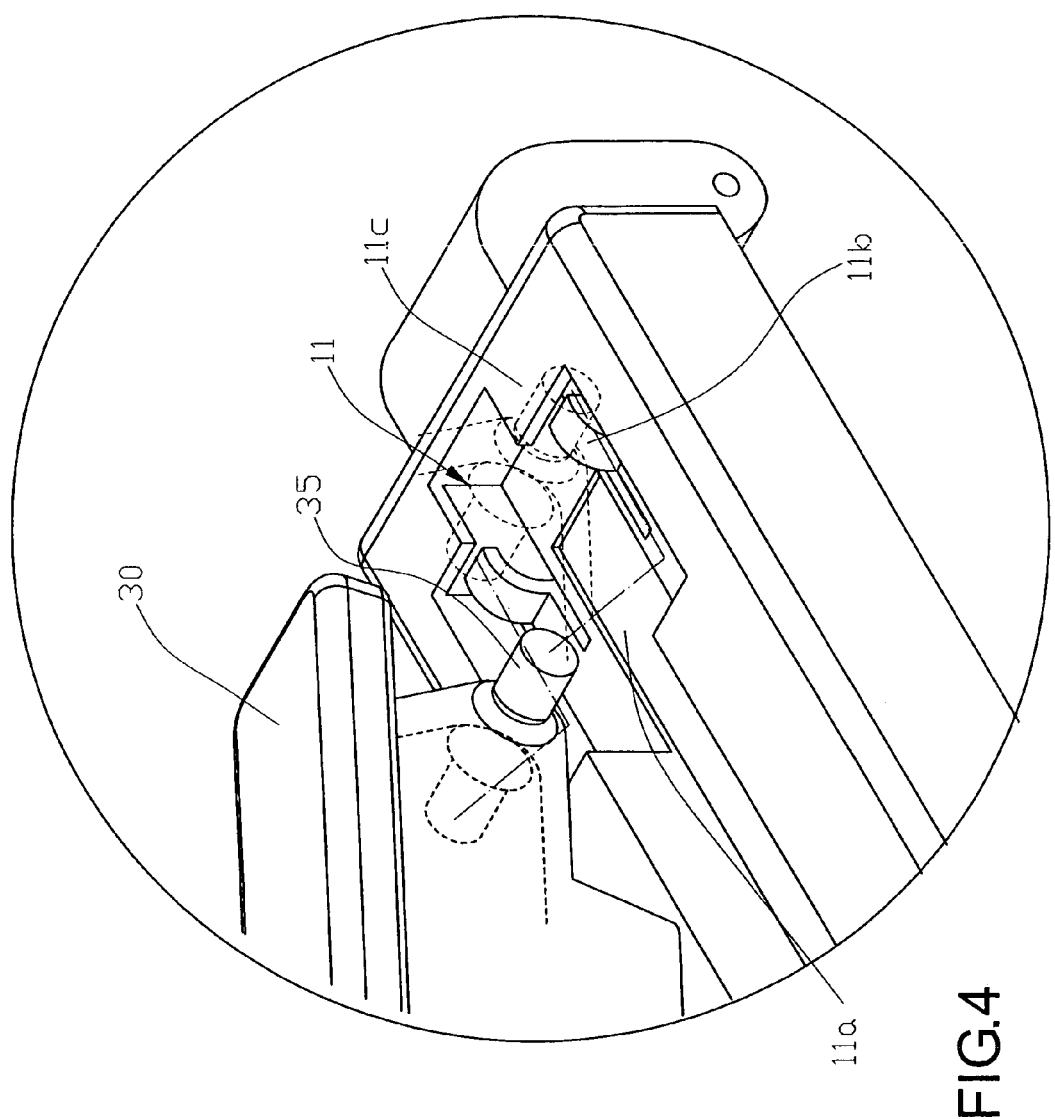
FIG. 4 shows a schematic view of a clasp-eye and a clasp combination according to the present invention.

Referring to FIG. 4, the clasp-eye 11 and the clasp 30 of the present invention adopts a sliding joint configuration. A joint end of the clasp-eye 11 and the clasp 30 is provided with a sliding space 11a, moreover, springs 11b are separately configured on two sides of the sliding space 11, and a block portion 11c is configured atop each of the springs 11b. Protruding posts 35 extending from left and right sides of a rear end of the clasp 30 are inserted within the sliding space 11a, and which slide towards direction of the springs 11b, thereby clamping the protruding posts 35 between the springs 11b and the block portions 11c, and forming a rotatable state thereat.

Figure 5A:
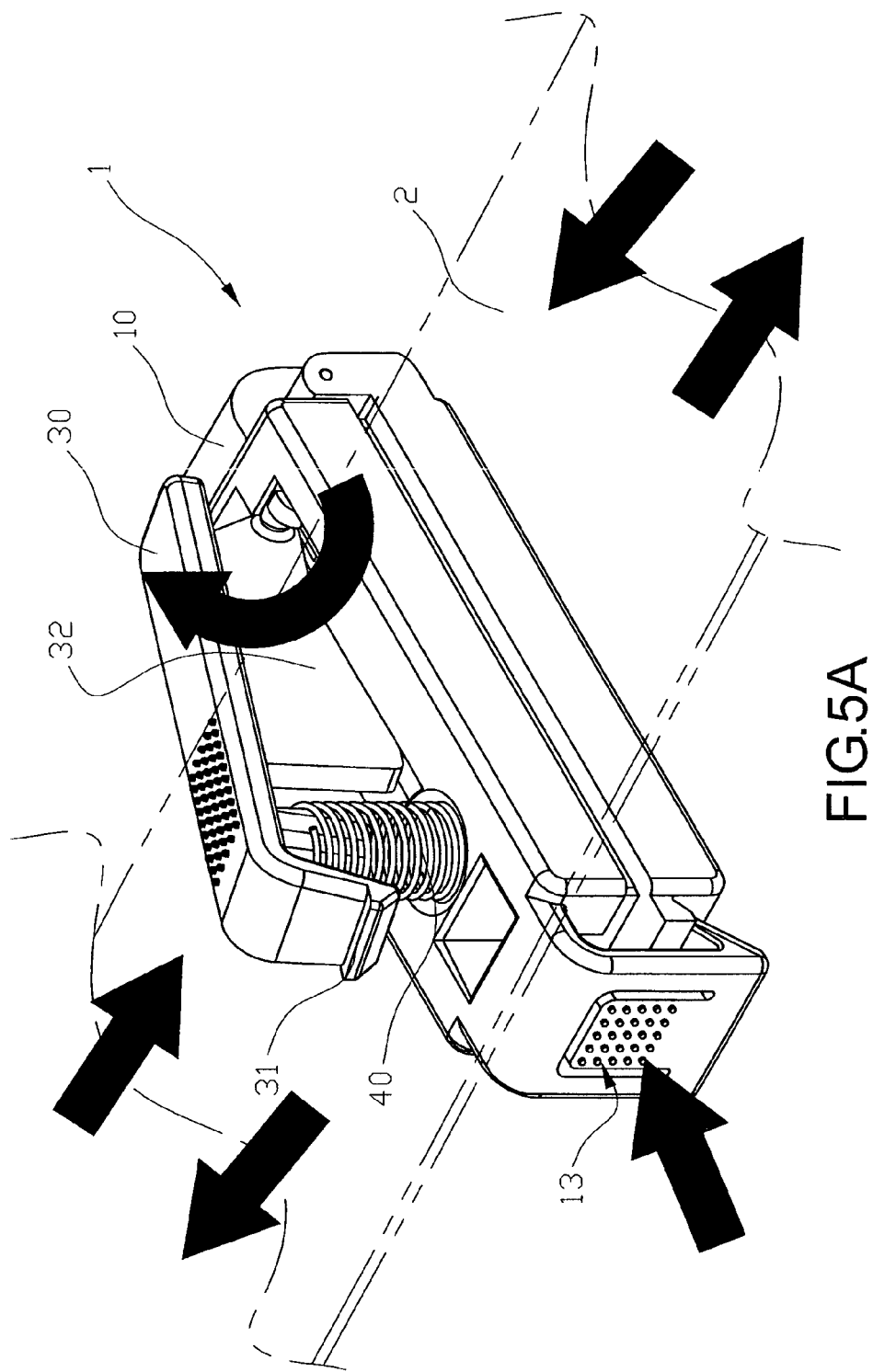
FIG. 5A shows a schematic view of the clasp released according to the present invention.
Figure 5B:
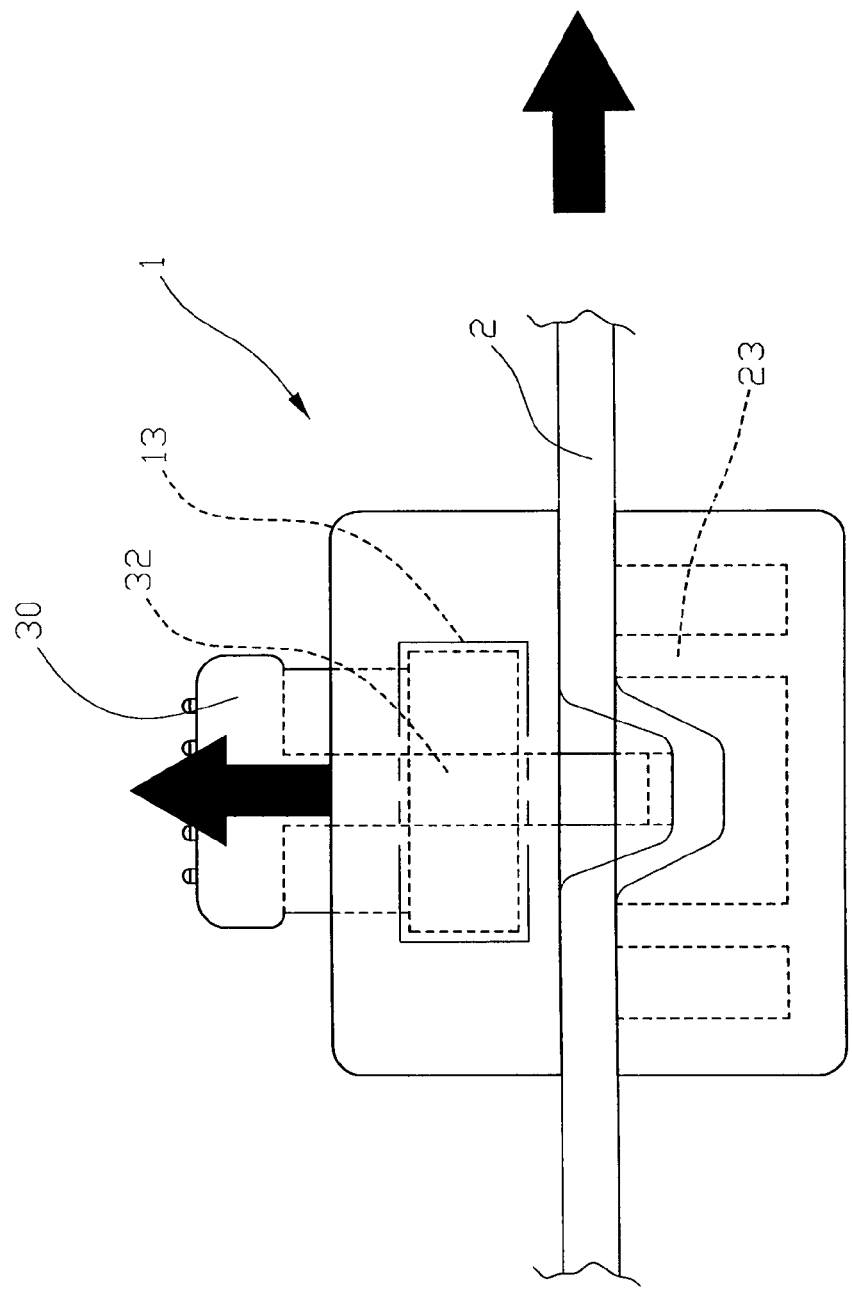
FIG. 5B shows a schematic view of another method for releasing the clasp according to the present invention.

The clasp 30 of the present invention provides two methods for releasing a safety belt 2. Referring to FIG. 5A, the first of such methods involves directly pressing on the clasp switch 13 configured on a side of the top cover 10. After effectuating release of the catch 31 of the clasp 30 by means of a tensile force of the spring 40 of the clasp 30, the clasp 30 is thereby caused to flip upwards, achieving separation of the rectangular raised strip 32 from the safety belt 2, which thus enables the positioning device 1 to return to a slideable state. Referring to FIG. 5B, which depicts a second release method of the present invention, whereby pulling on the safety belt 2 on two sides of the positioning device 1, because pulling force on the two sides effectuates flattening of the safety belt 2 between the two reinforcing ribs 23, which thus effectuates upwardly squeezing of the rectangular raised strip 32, the catch 31 configured on the frontal end of the clasp 30 is thereby disabled from clamping the clasp switch 13, and the positioning device 1 thus comes loose. Furthermore, because the second release method in an emergency situation can cause the safety belt 2 between a fixed end and a movable free end to generate a tension brace tensile force, which actuates the clasp 30 to automatically flip open by means of the tensile force, thereby avoiding reduction in protective functionality of the safety belt 2.

In conclusion, the safety belt positioning device of the present invention, after moveably clasping the top cover 10 and the bottom cover 20 onto the safety belt 2, utilizes the clasp 30 of the top cover 10 to adjust degree of tightness of the safety belt 2, which not only effectuates easy installation, moreover, realizes convenient adjustment, and actualizes avoiding reduction in protective functionality of the safety belt 2. The present invention further embodies practicability and advancement, accordingly, the inventor of the present invention hereby proposes a new patent application.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A safety belt positioning device comprising a top cover and a bottom cover pin jointed together, wherein
a clasp-eye is defined central of a top potion of the top cover, a clasp is configured interior of the clasp-eye; a frontal end of the clasp is provided with a first catch, and a rear end of the clasp is fixedly pin jointed within the clasp-eye, an underside of the clasp is provided with a rectangular raised strip and a spring anchor block, a spring is located around the spring anchor block within a spring aperture of the top cover, a front end of the top cover is provided with a clasp switch and a second catch; after the clasp has been press inserted within the clasp-eye of the top cover the first catch of the clasp clasps onto the clasp switch configured interior of the top cover; a front end of the bottom cover is provided with a clasp portion that corresponds to the second catch of the top cover, and an interior of the bottom cover is provided with a rectangular groove and reinforcement ribs configured on two sides thereof.

2. The safety belt positioning device according to claim 1, wherein a top surface of the clasp is provided with a nonslip knobbly structure.

3. The safety belt positioning device according to claim 1, wherein an exterior wall of the bottom cover is provided with a nonslip knobbly structure.

* * * * *